United States Patent Office 3,505,343
Patented Apr. 7, 1970

3,505,343
1-LOWER ALKYL-4-(2'-HYDROXYLOWER ALKYL)-4-PIPERIDINOLS AND LOWER ALKYL ACID ESTERS THEREOF
Hans Herbert Kühnis, Hugo Ryf, and Rolf Denss, Basel, Switzerland, assignors to Geigy Chemical Corporation, Ardsley, N.Y., a corporation of New York
No Drawing. Continuation-in-part of application Ser. No. 520,093, Jan. 12, 1966, which is a continuation-in-part of application Ser. No. 382,955, July 15, 1964. This application Sept. 29, 1967, Ser. No. 671,571
Claims priority, application Switzerland, Jan. 15, 1965, 606/65
Int. Cl. C07d 29/24, 29/16; A61k 27/00
U.S. Cl. 260—294.3   5 Claims

ABSTRACT OF THE DISCLOSURE

The compounds are of the class of piperidine derivatives substituted in 4-position by a hydroxyalkyl and a hydroxy or ester group useful as analgesic and antitussive agents. Illustrative embodiments are 1-methyl-4-(2' - hydroxypropyl)-4-piperidinol and 1-methyl-4-(2'-hydroxybutyl)-4-piperidyl propionate.

CROSS-REFERENCE

This is a continuation-in-part application of pending application Ser. No. 520,093, filed Jan. 12, 1966, now U.S. 3,408,357; which in turn is a continuation-in-part application of pending application Ser. No. 382,955 filed July 15, 1964 now U.S. 3,366,638.

DESCRIPTION OF INVENTION

The present invention relates to compounds which may be characterized by the following Formula I

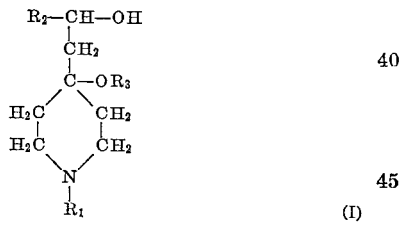

(I)

wherein:

$R_1$ represents alkyl having at most 4 carbon atoms;
$R_2$ represents alkyl having at most 4 carbon atoms or phenyl; and
$R_3$ represents hydrogen or lower alkanoyl having at most 3 carbon atoms and their salts with inorganic and organic acids.

Preferred are those compounds according to Formula I wherein $R_1$ is methyl, $R_2$ is alkyl of 1 or 2 carbon atoms, and $R_3$ is hydrogen or lower alkanoyl having at most 3 carbon atoms.

These preferred compounds have especially valuable pharmacological properties, particularly excellent antitussive properties on oral as well as parenteral administration.

Further, they have a mild analgetic action and there is no danger of addiction to be expected either on administration as antitussives or as analgetics. In contrast to other known analgetics, they have no parasympatholytic properties, rather they have a parasympathomimetic action. At the same time, they have relatively low toxicity and are thus suitable, for example, for the relief and removal of tussive irritation and also of pain of various origin.

The compounds of Formula I and their salts with inorganic and organic acids may be administered orally, rectally and parenterally.

The daily dosages of the free bases or of non-toxic salts thereof vary between 1 and 500 mg. for adult patients. Suitable dosage units such as dragées (sugar coated tablets), tablets, suppositories or ampoules, preferably contain 1–200 mg. of an active substance according to the invention or of a non-toxic salt thereof.

By non-toxic salts of the bases usable according to the invention are meant salts with those acids the anions of which are pharmacologically acceptable in the usual dosages, i.e. those which have no toxic effects. It is also of advantage if the salts to be used crystallize well and are not or are only slightly hygroscopic. As non-toxic salts instead of the free bases, for example, the salts with hydrochloric acid, hydrobromic acid, sulphuric acid, phosphoric acid, methane sulphonic acid, ethane sulphonic acid, β-hydroxyethane sulphonic acid, acetic acid, malic acid, tartaric acid, citric acid, benzoic acid, salicylic acid, phenyl acetic acid, mandelic acid and embonic acid can be used as active substances.

In the compounds of general Formula I and in the starting materials used therefor which are mentioned below $R_1$ represents, e.g. alkyl radicals such as the methyl, ethyl, n-propyl, isopropyl, n-butyl, isobutyl or sec. butyl radical. $R_2$ is, e.g. the methyl, ethyl, n-propyl, isopropyl, n-butyl, isobutyl, sec. butyl, tert. butyl or the phenyl radical. $R_3$ is preferably a low alkanoyl radical such as the acetyl or propionyl radical or it is a hydrogen atom.

The production of the compounds of general Formula I and their salts with inorganic and organic acids is carried out by reducing a compound of the general Formula II

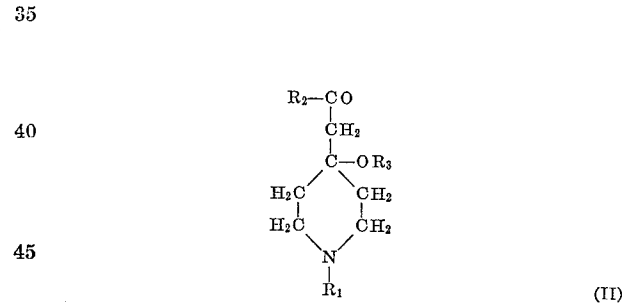

(II)

wherein $R_1$, $R_2$ and $R_3$ have the meanings given in Formula I and, if desired, converting the compound obtained of general Formula I into a salt with an inorganic or organic acid.

The reduction can be performed with catalytically activated hydrogen under the most varied reaction conditions and with a great choice of catalysts. In general, the hydrogenation can be performed in the presence of noble metal catalysts such as palladium on charcoal, alkaline earth metal carbonates or sulphates or platinum on charcoal as carrier, or in the presence of alloy skeleton catalysts such as Raney nickel. It is performed in the usual solvents until no more hydrogen is taken up. The reduction can also be performed with a complex hydride. For example, lithium aluminium hydride is an ethereal solvent such as diethyl ether or tetrahydrofuran or sodium borohydride in an aqueous or alkanolic solvent are suitable.

Compounds of general Formula II wherein the radical $R_3$ is hydrogen can be produced in their turn surprisingly easily by reacting a 4-piperidone of the general Formula III

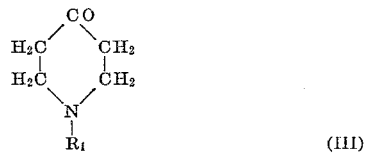

with a ketone of the general Formula IV $$R_2—CO—CH_3 \quad (IV)$$

wherein $R_1$ and $R_2$ have the meanings given in general Formula I the reaction being performed in the presence of a basic or acid substance in homogeneous or heterogenous phase.

As basic condensing agents can be used, on the one hand, inorganic bases such as sodium hydroxide and organic bases such as piperidine, piperazine and, in anhydrous medium or in the absence of solvents, also alkali metal alcoholates, and on the other, basic ion exchangers, preferably those having quaternary ammonium groups such as Amberlite IRA 400 (OH$^\ominus$), but also more weakly basic ones such as Amberlite IR 4B, which can be used in batches or, optionally, in a continuous process. Depending on the solubility of the starting materials, for example water, an aqueous or an anhydrous lower alkanol or another polar solvent can be used as reaction medium.

Examples of acid condensing agents are ammonium salts such as ammonium acetate, alone or combined with glacial acetic acid and, optionally an inert solvent, e.g. benzene, as well as acid ion exchangers, e.g. Amberlite IR 120 (H$^\oplus$ form) in water or an aqueous low alkanol as reaction medium.

The condensations are preferably performed at room temperature to moderately raised temperature, i.e. the preferred temperature range for obtaining starting materials of the general Formula II is between about 20 and 60°.

An acetyl or propionyl radical as acyl radical $R_3$ can easily be introduced by reacting compounds of the general Formula II containing a hydrogen atom as $R_3$ with the corresponding anhydride at 0° C. to room temperature or weakly raised temperature.

The following examples further illustrate the performance of the process according to the invention but are by no means the sole methods of performing same. The temperatures are given in degrees centigrade, and percentages are given by weight.

Example 1

A solution of 1.1 g. of lithium aluminium hydride in 15 ml. of abs. ether is refluxed for 20 minutes. It is then cooled to 10° and 5 g. of 1-(1'-methyl-4'-hydroxy-4'-piperidyl)-2-propanone in 15 ml. of abs. ether is slowly added dropwise while stirring and cooling. The reaction mixture is stirred for another 2 hours at room temperature and then, at 10°, 70% methanol and then water are added and the whole is filtered under suction. The residue is washed with ether and the filtrate is evaporated. The residue is taken up in ether, the ether solution is dried and evaporated and the residue is crystallized from ether. The 1-methyl - 4 - (2' - hydroxypropyl) - 4 - piperidinol obtained melts at 76–77°. The citrate melts at 92°.

1-methyl-4-(2'-hydroxy-pentyl) - 4 - piperidinol is produced in an analogous way. Its citrate melts at 145–146°.

Example 2

20 ml. of a saturated aqueous sodium carbonate solution are added to 8.66 g. of 1-(1'-methyl-4'-propionoxy-4'-piperidyl)-2-butanone citrate and the whole is extracted four times with 30 ml. of chloroform each time. The combined chloroform extracts are dried and evaporated at 20°. The free base which remains (4.81 g.) is dissolved in 35 ml. of methanol, the solution is cooled to 0° and 835 mg. of sodium borohydride are added in portions within 20 minutes while stirring well and cooling with ice. The reaction mixture is then stirred for another 10 minutes at room temperature, 20 g. of ice water are added and it is extracted six times with 30 ml. of chloroform each time. The chloroform extracts are dried and concentrated in vacuo at 20°. The residue is dissolved in a small amount of methanol and acetonic citric acid solution is added. The citrate of 1-methyl-4-(2'-hydroxybutyl)-4-piperidyl propionate [α-ethyl-1-methyl-4-propionoxy-4-piperidine ethanol citrate] which precipitates is recrystallized from acetone/methanol. M.P. 148–150°.

Example 3

4.33 g. of 1-(1'-methyl-4'-propionoxy-4'-piperidyl)-2-butanone citrate are dissolved in 30 ml. of methanol and 10 ml. of water, the solution is placed in a stirring apparatus and a solution of 2.28 g. of sodium borohydride in 25 ml. of water and 2.5 ml. of 2 N sodium hydroxide solution is added within 5 minutes. Stirring is continued for another 30 minutes and the solution is then evaporated in a rotary evaporator, made alkaline with concentrated sodium hydroxide solution, extracted with chloroform, dried and evaporated. The citrate of 1-methyl-4-(2'-hydroxybutyl)-4-piperidyl - propionate [α-ethyl-1-methyl-4-propionoxy-4-piperidine ethanol] is produced from this crude product, as described in Example 2. Recrystallized from acetone/methanol it melts at 148–150°.

What is claimed is:

1. A compound selected from the class consisting of a piperidine derivative of the formula

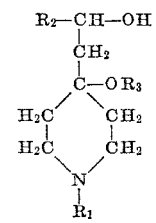

wherein:

$R_1$ represents alkyl of at most 4 carbon atoms, $R_2$ represents alkyl of at most 4 carbon atoms or phenyl, and $R_3$ represents hydrogen or lower alkanoyl of from 1 to 3 carbon atoms, and a pharmaceutically acceptable salt thereof with an acid.

2. A compound as defined in claim 1 wherein $R_1$ is methyl, and $R_2$ is alkyl of from 1 to 3 carbon atoms.

3. A compound as defined in claim 1 wherein $R_1$ is methyl, $R_2$ is methyl and $R_3$ is hydrogen.

4. A compound as defined in claim 1, wherein $R_1$ is methyl, $R_2$ is propyl, and $R_3$ is hydrogen.

5. A compound as defined in claim 1, wherein $R_1$ is methyl, $R_2$ is ethyl, and $R_3$ is propionyl.

References Cited

UNITED STATES PATENTS 3,408,357   10/1968   Kühnis _____ 260—294.3

HENRY R. JILES, Primary Examiner

G. T. TODD, Assistant Examiner

U.S. Cl. X.R.

260—293.4, 294, 294.7, 299.9